US009884358B2

United States Patent
Knockeart

(10) Patent No.: US 9,884,358 B2
(45) Date of Patent: Feb. 6, 2018

(54) METHOD FOR FORMING OFF-SET DIMPLES IN METAL SHEETS

(71) Applicant: Delaco Steel Corp., Dearborn, MI (US)

(72) Inventor: Charles Knockeart, Lake Orion, MI (US)

(73) Assignee: DELACO STEEL CORP, Dearborn, MI (US)

( * ) Notice: Subject to any disclaimer, the term of this patent is extended or adjusted under 35 U.S.C. 154(b) by 0 days.

(21) Appl. No.: 15/442,959

(22) Filed: Feb. 27, 2017

(65) Prior Publication Data
US 2017/0326611 A1 Nov. 16, 2017

Related U.S. Application Data

(62) Division of application No. 15/193,306, filed on Jun. 27, 2016, now Pat. No. 9,623,470.

(60) Provisional application No. 62/335,411, filed on May 12, 2016.

(51) Int. Cl.
| | |
|---|---|
| *B21D 22/00* | (2006.01) |
| *B21D 22/04* | (2006.01) |
| *B23D 33/00* | (2006.01) |
| *B21D 43/22* | (2006.01) |

(52) U.S. Cl.
CPC ............ *B21D 22/04* (2013.01); *B21D 43/22* (2013.01); *B23D 33/00* (2013.01)

(58) Field of Classification Search
CPC ........ B21D 22/00; B21D 22/04; B21D 28/12; B21D 28/24; B21D 28/26; B21D 13/10; B21D 31/02
See application file for complete search history.

(56) References Cited

U.S. PATENT DOCUMENTS

| | | |
|---|---|---|
| 3,440,988 A | 4/1969 | Bremer |
| 5,673,585 A | 10/1997 | Bishop |
| 8,161,646 B2 | 4/2012 | Lin |

FOREIGN PATENT DOCUMENTS

EP    0688614 A1    12/1995

*Primary Examiner* — Debra Sullivan
(74) *Attorney, Agent, or Firm* — Daniela M. Thompson-Walters; The Dobrusin Law Firm P.C.

(57) ABSTRACT

A metal processing apparatus comprising: (i) a first tool portion including a first carrier, a cutting surface, a first plurality of dimple forming elements; (ii) a second tool portion including a second carrier, in opposing relation to the first tool portion, the second tool portion having a blade or adapted to receive the blade which is adapted to contact the cutting surface for cutting an edge of a metal sheet to form a cut edge in the metal sheet, a second plurality of dimple forming elements; and (iii) a dimpler indexer to index the first plurality of dimple forming from a first pre-determined location to a second pre-determined location. The metal processing apparatus may find particular use in creating dimples along one or more cut edges of a metal sheet to allow for stacking of the metal sheets with an airgap therebetween.

18 Claims, 9 Drawing Sheets

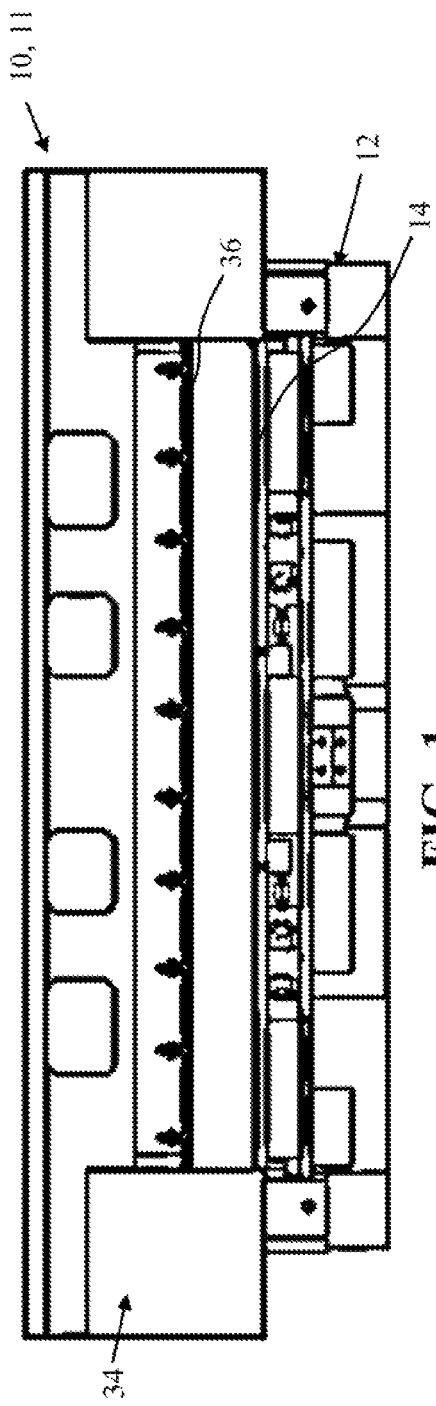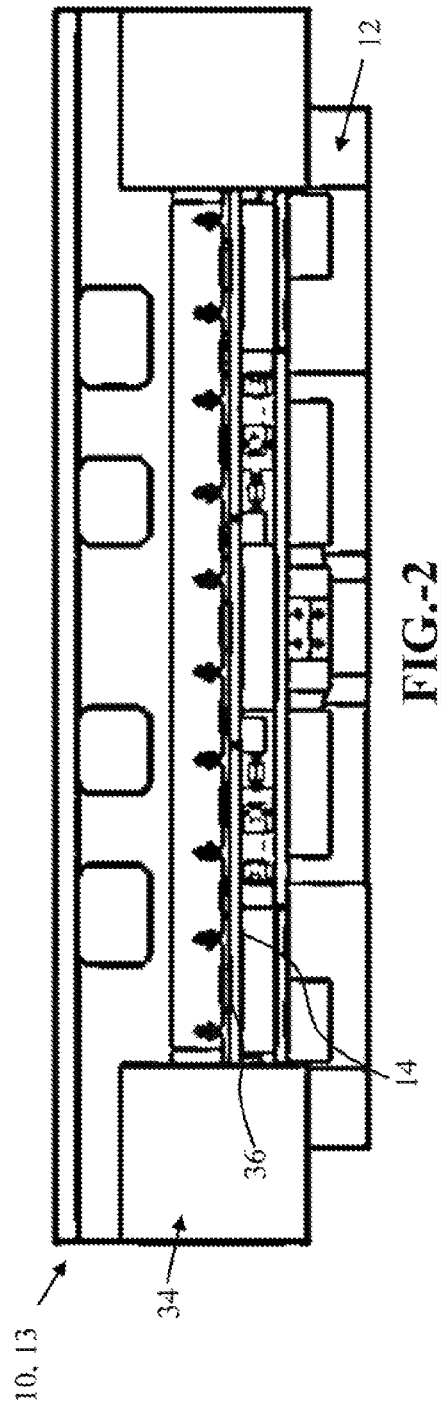

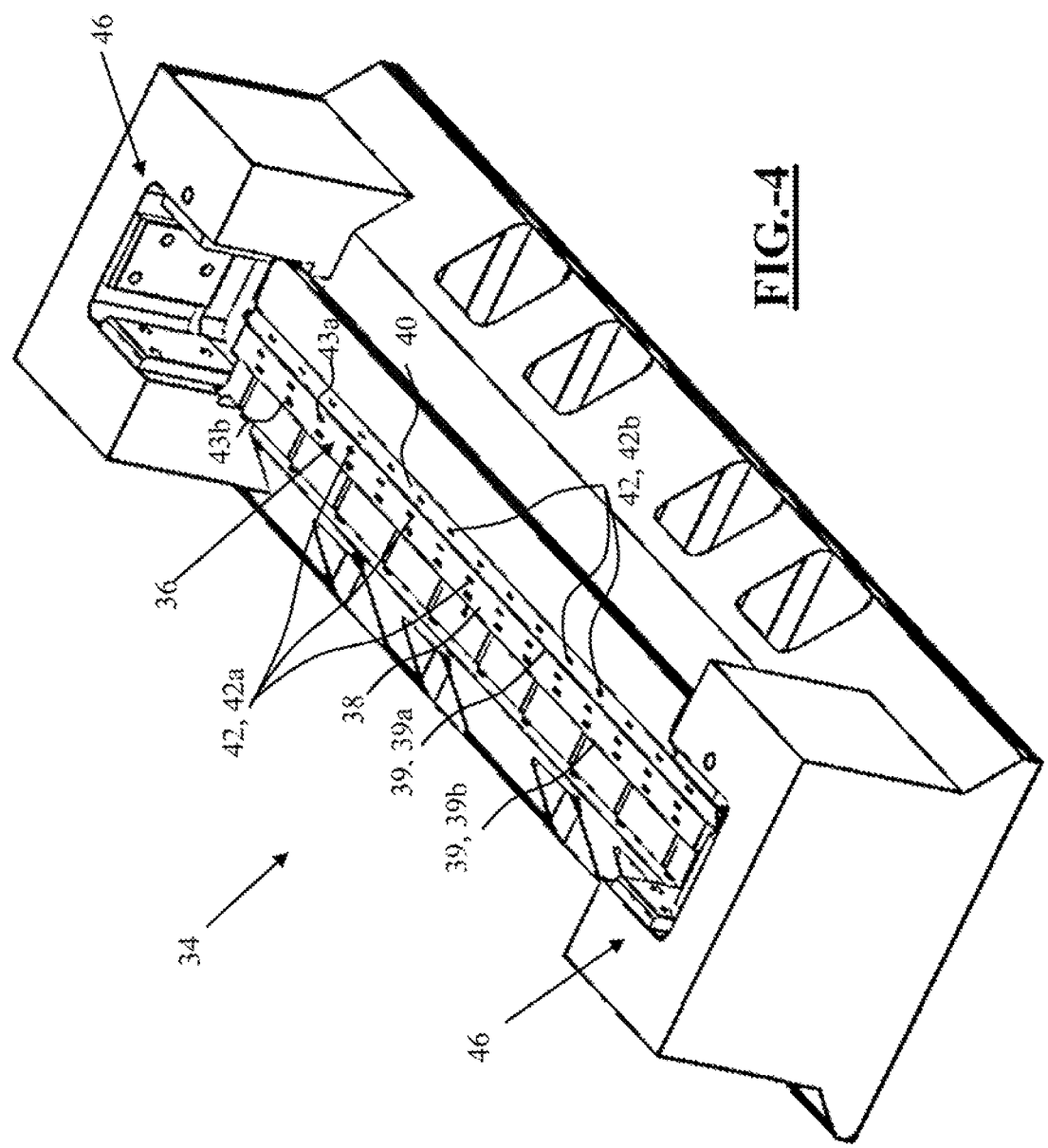

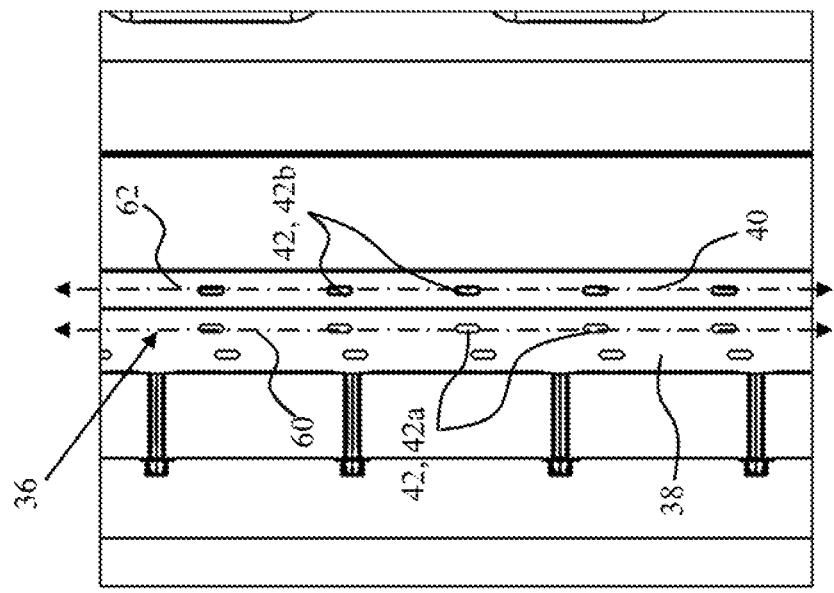
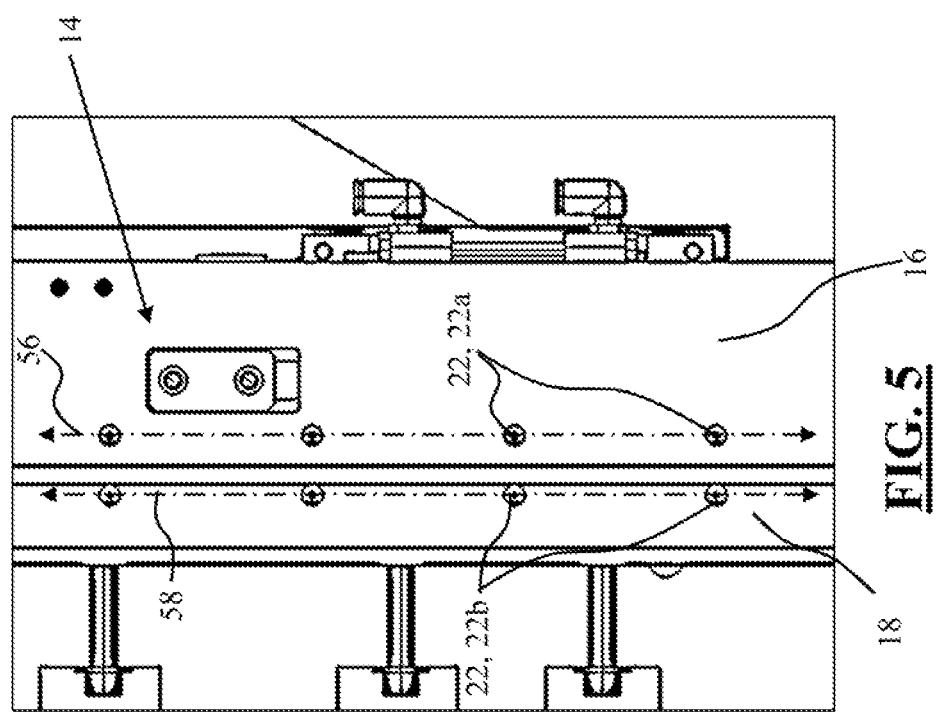

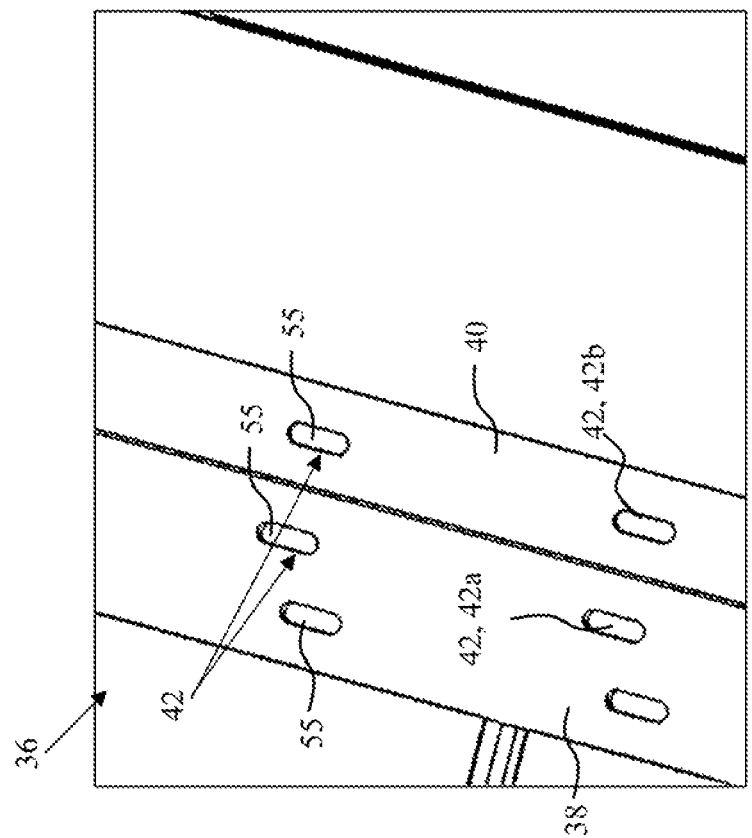
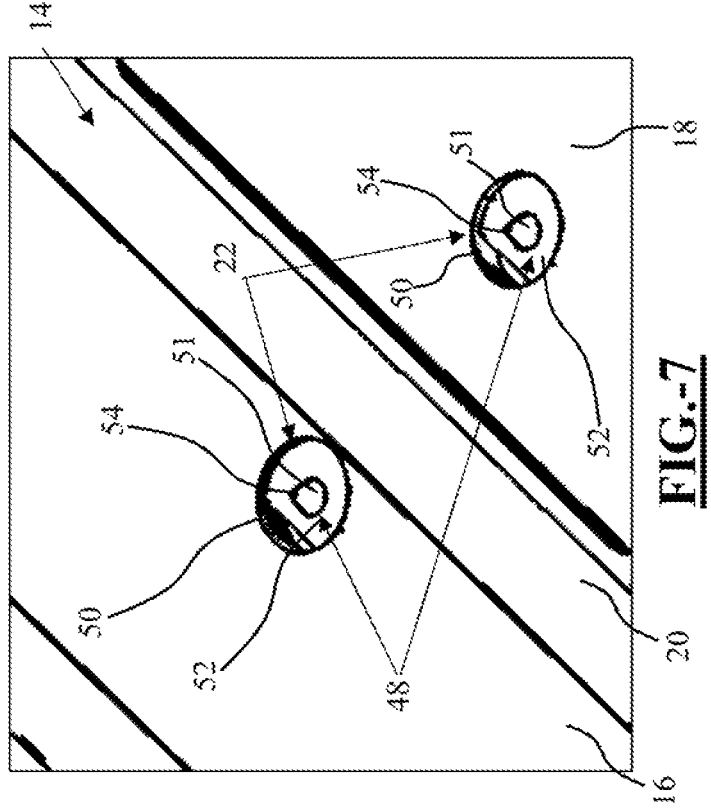

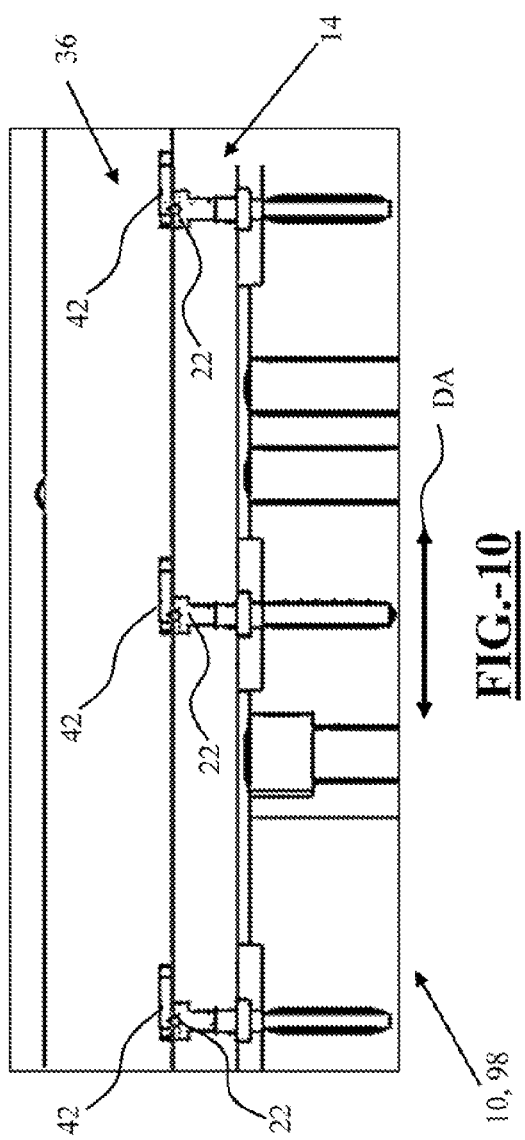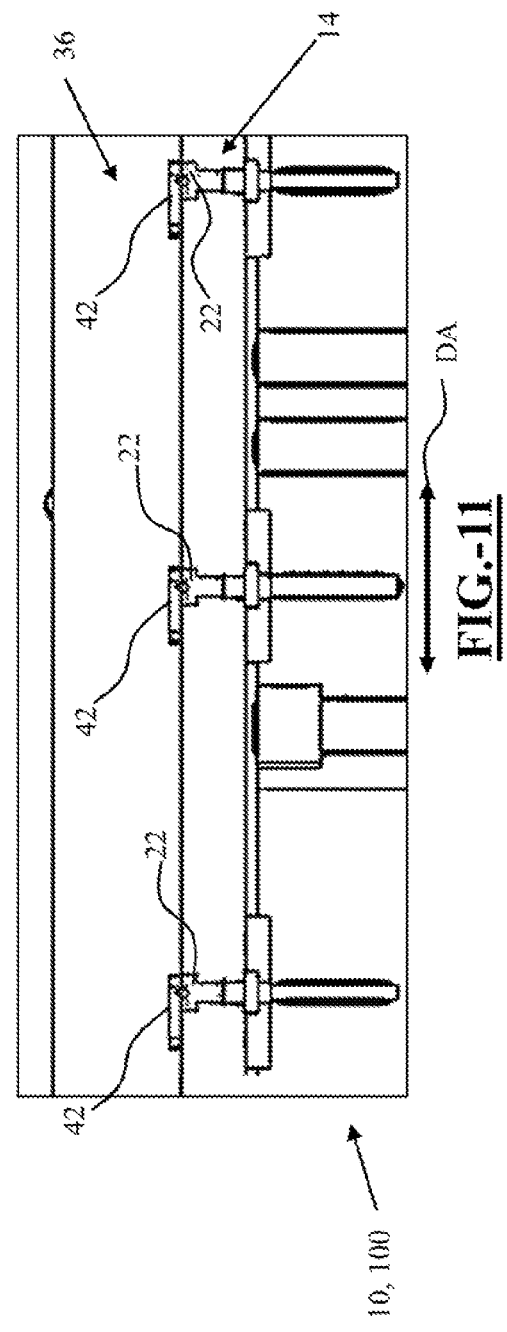

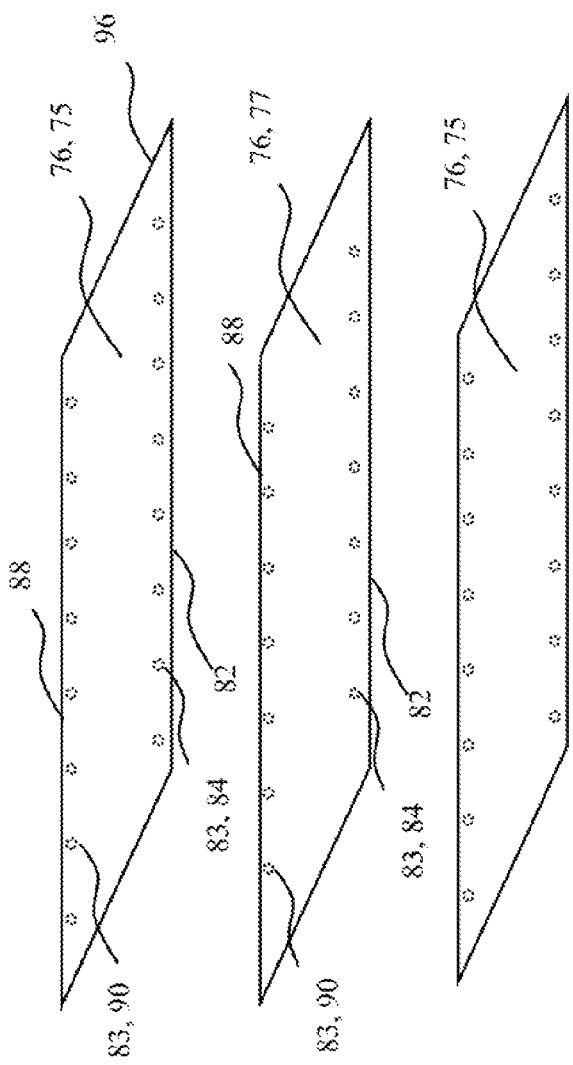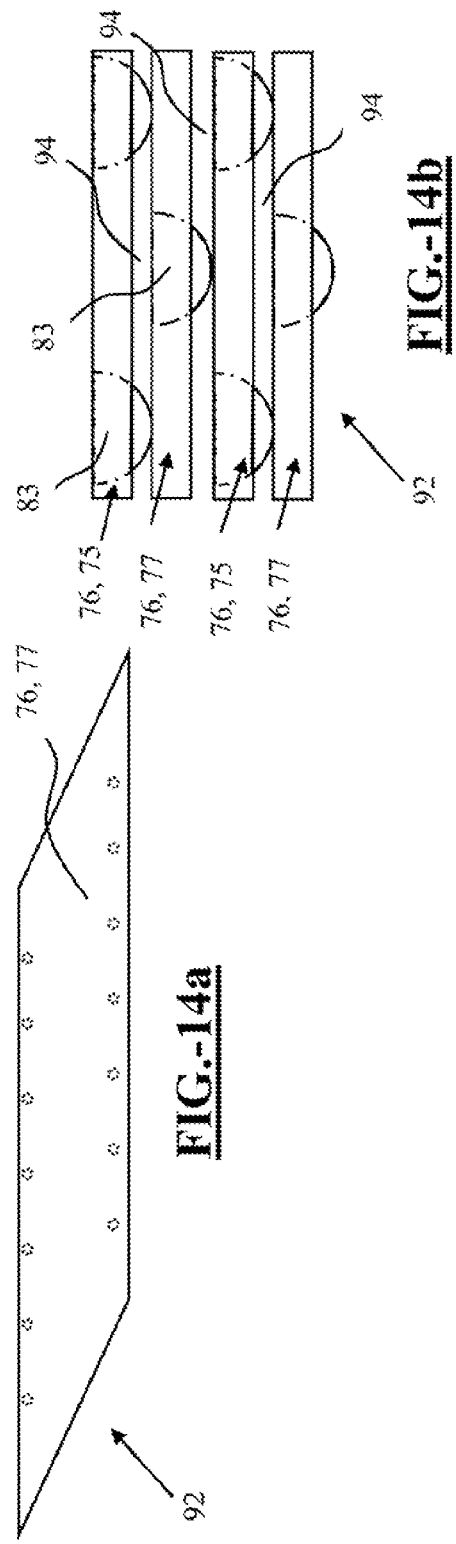

METHOD FOR FORMING OFF-SET DIMPLES IN METAL SHEETS

FIELD

The present disclosure relates to a metal processing apparatus and method for forming dimples in metal sheets. The present disclosure may specifically relate to forming dimples in sheet metal along a cut edge to improve handling after the sheet metal is stacked with other sheet metal.

BACKGROUND

Generally, after a metal sheet has been cut from a metal coil to form a blank for a metal sheet, or cut from a blank to form a metal sheet, the metal sheet is stacked on top of one or more metal sheets for storage, shipping, and handling. When the metal sheets are stacked with one another, there is often minimal, if any, distance between the sheets (i.e., no gap). This lack of distance between the metal sheets results in difficulty in separating the sheets from one another. For example, robotic handling grips cannot insert any part of an end effector in between the sheets to then lift a sheet off of the stack. U.S. Pat. No. 3,440,988 describes the problems encountered in stacking flat metal sheets and forming non-structural deformations (i.e. dimples) to help prevent the metal sheets from stacking tightly.

EP0688614 discloses a method and apparatus for stamping a dimple into a sheet-metal blank to enable uniform stacking of the metal blanks. U.S. Pat. No. 5,673,585 discloses a punching or stamping apparatus for forming dimples in sheet metal such that no two dimples formed in subsequent blanks align when the blanks are stacked. Notwithstanding the above, there appears an absence of teaching to form dimples adjoining a cut edge and multiple sheets with staggered dimples along cut edges.

What is needed is a method for stacking metal sheets which allows the sheets to be easily removed from the stack. What is also needed is an apparatus which can create features in the metal sheets which allow for a gap to be formed in between the sheets when placed in a stack. What is needed is an apparatus which can off-set features, such as dimples, so as to avoid the features nesting with another to maintain the gap between the sheets when placed in a stack. What is needed is an apparatus which can create a plurality of dimples metal sheets in incrementally off-set locations to prevent nesting of the metal sheets.

SUMMARY

The present disclosure relates to a metal processing apparatus comprising: (i) a first tool portion including a first carrier, the first tool portion having: (a) a forward portion and a rearward portion; (b) a cutting surface which is adapted to be contacted with a blade and wherein the forward portion and the rearward portion are an opposing sides of the cutting surface; (c) a first plurality of dimple forming elements located on the forward portion, the rearward portion, or both; (ii) a second tool portion including a second carrier, wherein the second tool portion is adapted to be located in opposing relation to the first tool portion, the second tool portion having: (a) a forward portion and a rearward portion; (b) a blade or configured to receive a blade adapted to contact the cutting surface for cutting an edge of a metal sheet to form a cut edge in the metal sheet, wherein the forward portion and the rearward portion on opposing sides of the blade; (c) a second plurality of dimple forming elements located on the forward portion, rearward portion, or both and aligned with the first plurality of dimple forming elements; and (iii) a dimpler indexer to index the first plurality of dimple forming elements from a first pre-determined location to a second pre-determined location.

A method for dimpling a cut edge portion of a metal sheet comprising: (i) feeding a first metal sheet in a feeding direction; (ii) cutting a forward portion of the first metal sheet to define a front cut edge in the first metal sheet; (iii) forming a first plurality of dimples located in a first pre-determined location substantially along the front cut edge of the first metal sheet; (iv) advancing the first metal sheet in the feeding direction; (v) cutting a rearward portion of the first metal sheet to define a rear cut edge in the first metal sheet and define a perimeter of the first metal sheet; (vi) forming a second plurality of dimples in a second pre-determined location substantially along the rear cut edge of the first metal sheet; (vii) feeding a second metal sheet in the feeding direction; (viii) cutting a forward portion of the second metal sheet to define a front cut edge in the second metal sheet; (ix) forming a first plurality of dimples located in a third pre-determined location substantially along the front cut edge of the second metal sheet; (x) advancing the second metal sheet in the feeding direction; (xi) cutting a rearward portion of the second metal sheet to define a rear cut edge in the second metal sheet and define a perimeter of the second metal sheet; (xii) forming a second plurality of dimples in a fourth pre-determined location substantially along the rear cut edge of the second metal sheet; (xiii) forming a stack of metal sheets including the first metal sheet and the second metal sheet, wherein an air gap is located between the first metal sheet and the second metal sheet substantially about the perimeter of the first metal sheet and the second metal sheet, wherein the air gap is greater than about 0.1 mm; and wherein the first pre-determined location is off-set relative to the third pre-determined location and wherein the second pre-determined location is off-set relative to the fourth pre-determined location.

The present disclosure may provide a metal processing apparatus and a method for forming a plurality of dimples in one or more metal sheets. The plurality of dimples in the one or more metal sheets may allow for an air gap between the one or more metal sheets when stacked with one another. The air gap between the metal sheets may allow for the sheets to be easily separated, such as with a tool or by hand.

BRIEF DESCRIPTION OF THE DRAWINGS

FIG. 1 illustrates a metal processing apparatus in an open position according to the teachings.

FIG. 2 illustrates a metal processing apparatus in a closed position according to the teachings.

FIG. 4 illustrates a second tool portion of a metal processing apparatus according to the teachings.

FIG. 5 illustrates a first plurality of dimple forming elements located in a first tool portion according to the teachings.

FIG. 6 illustrates a second plurality of dimple forming elements located in a second tool portion according to the teachings.

FIG. 7 illustrates the first plurality of dimple forming elements of FIG. 5 according to the teachings.

FIG. 8 illustrates the second plurality of dimple forming elements of FIG. 6 according to the teachings.

FIG. 10 illustrates a first position of the metal processing apparatus according to the teachings.

FIG. 11 illustrates a second position of the metal processing apparatus according to the teachings.

FIG. 14a illustrates an exploded view of a stack of metal according to the teachings.

FIG. 14b illustrates a close-up view of the stack of metal of FIG. 14a according to the teachings herein.

DETAILED DESCRIPTION

Figure 3:
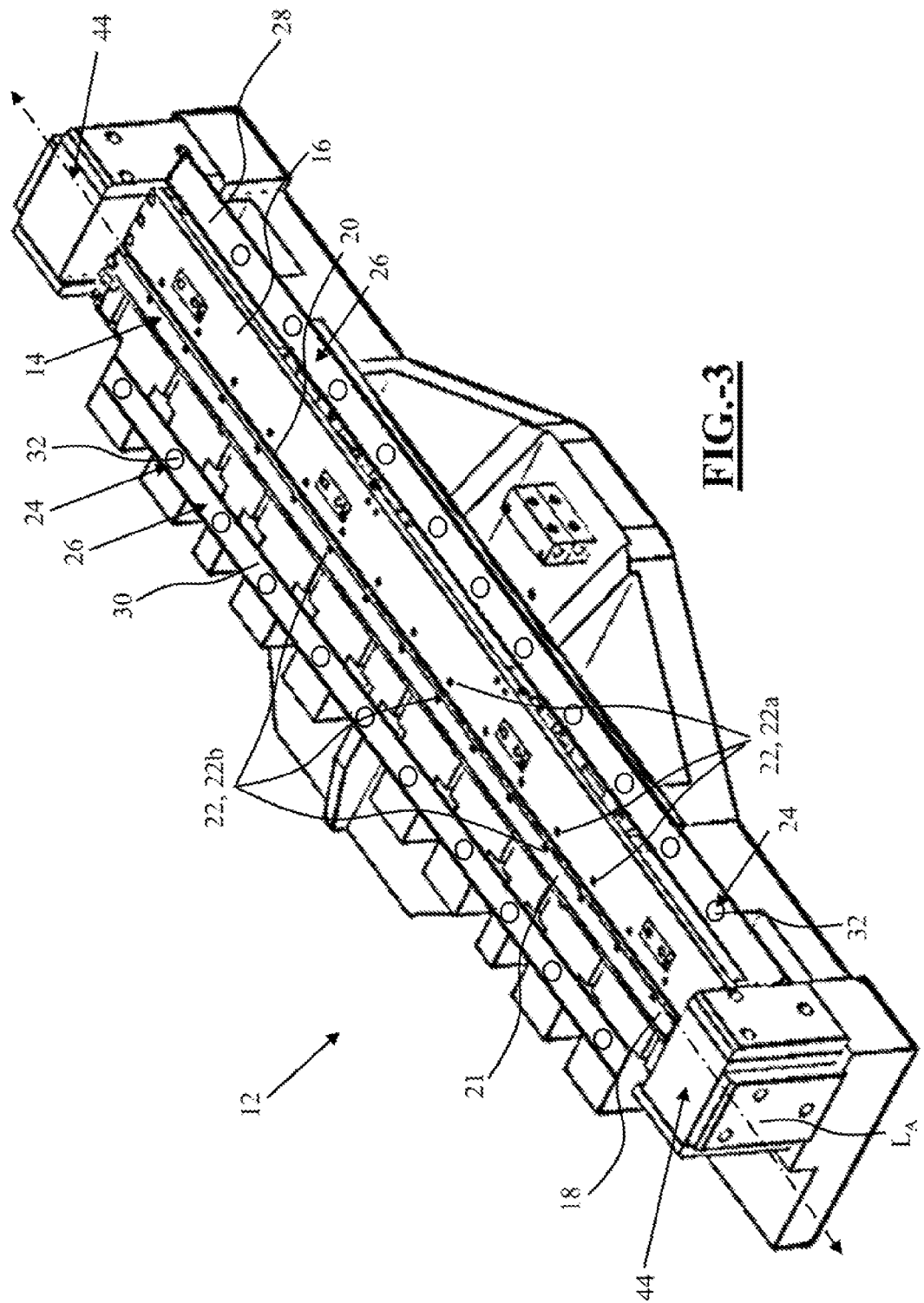
FIG. 3 illustrates a first tool portion of a metal processing apparatus according to the teachings.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The disclosure relates to a metal processing apparatus which may be an apparatus for forming one or more pluralities of dimples in sheet metal. The metal processing apparatus may find particular use as a die for cutting and/or shaping metal sheets. The metal processing apparatus may include: a first tool portion including a first carrier, the first tool portion having: a forward portion and a rearward portion; a cutting surface which is adapted to be contacted with a blade and wherein the forward portion and the rearward portion are an opposing sides of the cutting surface; and a first plurality of dimple forming elements located on the forward portion, the rearward portion, or both. The metal processing apparatus may include: a second tool portion including a second carrier, wherein the second tool portion is adapted to be located in opposing relation to the first tool portion and may be reciprocally moveable relative to the first tool portion, the second tool portion having: a forward portion and a rearward portion; a blade or configured to receive a blade adapted to contact the cutting surface for cutting an edge of a metal sheet to form a cut edge in the metal sheet, wherein the forward portion and the rearward portion on opposing sides of the blade; a second plurality of dimple forming elements located on the forward portion, rearward portion, or both and aligned with the first plurality of dimple forming elements. The metal processing apparatus may include a dimpler indexer to index a plurality of dimple forming elements from a first pre-determined location to a second pre-determined location. The metal processing apparatus may specifically be adapted for providing one or more pluralities of dimples in sheet metal, such as substantially along at least a portion of the perimeter. The metal processing apparatus may specifically be adapted for off-setting a first pre-determined location of a plurality of dimples in one metal sheet from a second pre-determined location of a plurality of dimples in a second metal sheet. By off-setting the plurality of dimples between the first and second metal sheets, when the metal sheets are stacked, the first and second metal sheets are restricted from nesting (that is, the dimples do not coincide with each other and a female dimple portion does not receive a male dimple portion). By restricting nesting, an air gap is left between the metal sheets to allow material handling access to unstack the metal sheets may rest in dimples of adjoining sheets. It is possible some dimples of a sheet may nest in dimples of adjoining sheets in the metal stack.

The metal processing apparatus includes one or more tool portions, such as a first tool portion and a second tool portion. The one or more tool portions may provide support for one or more carriers, provide a cutting surface, provide support for or be capable of receiving a blade, provide a conveyance surface, mate with other tool portions, or any combination thereof. The one or more tool portions may serve as one or more die blocks. As die blocks, the one or more tool portions may provide support for most or all of the components of the metal processing apparatus. For example, the first tool portion may be a lower die and the second tool portion may be an upper die. For example, the first tool portion and second tool portion may be opposing each other side-by-side. The first tool portion and/or second tool portion may be sub-portions. The first tool portion may include one portion, two portions, or more. The second tool portion may include one portion, two portions, or more. The one or more tool portions may include one or more mating features which mate or join tool portions together. The mating features may include one or more bushings, one or more alignment pins, one or more legs, one or more pegs, one or more holes, one or more fasteners, one or more joints, the like, or any combination thereof. For example, a first tool portion may include one or more bushings which receive one or more alignment pins of a second tool portion. When the one or more tool portions are mated, the tool portions may form a lower portion (i.e., lower die) and an upper portion (i.e., upper die) of the metal processing apparatus. For example, a first tool portion may be a lower portion and a second tool portion may be an upper portion. When mated, the metal apparatus may include a longitudinal axis, which may extend from end to end, may run substantially perpendicular to a feeding direction, may be substantially parallel to a support surface upon which the apparatus rests (i.e., floor/ground surface, fixture table, etc), may be parallel to linear and/or incremental movement of one or more carriers, or any combination thereof. One or more of the tool portions may move toward another of the tool portions to apply a die force, a cutting force, or both. For example, the second tool portion may move toward the first tool portion. Alternatively, the tool portions may remain fixed while components, such as one or more carriers, may move toward one another. Each of the one or more tool portions may have a forward portion and a rearward portion. The forward portion may be located at the outgoing end of the metal processing apparatus and the rearward portion may be located at the incoming end of the metal processing apparatus. The one or more tool portions may include one or more carriers.

The one or more tool portions may include one or more carriers. The one or more carriers may function to provide off-set dimpling locations, support a plurality of dimpling elements, provide a cutting surface, and/or provide or receive a blade. The one or more carriers may serve as die blocks and/or punch plates, such as by providing support to one or more components of the metal processing apparatus, by including one or more features which produce a punch (i.e., dimples), or both. The one or more carriers may include a first carrier and a second carrier. A first carrier may be located in a first tool portion and a second carrier may be located in a second tool portion. The one or more carriers may be located between the forward portion and rearward portion of the one or more tool portions. The one or more carriers may be located internally in the one or more tool portions. The one or more tool portions may include one or more housings. The one or more carriers may be located internally of one or more housings. A first carrier may be located between the incoming end and the outgoing end of the first tool portion. A second carrier may be adapted to be in an opposing relationship with the first carrier, such as when the first tool portion is mated with the second tool portion. The one or more carriers may include contact surfaces suitable for coming into contact with sheet metal (e.g., sheet metal intended to provide a class A surface) such as by not damaging the sheet metal (i.e., scratching, gauging, denting, etc). The contact surfaces may be generally smooth and untextured surfaces including portions that are polymeric (e.g., a relatively hard polymer such as a polyamide), metal, ceramic, the like, or a combination thereof. The one or more carriers may be moveable, fixed, or a combination thereof. For example, a first carrier may be moveable while the second carrier may be fixed. The one or more carriers may be moveable in one or more axes, fixed in one or more axes, or both (e.g., in a z-axis, x-axis, and/or y-axis). For example, the first carrier may be moveable substantially parallel to the longitudinal axis of the apparatus, substantially parallel to a vertical axis substantially perpendicular to the longitudinal axis or both. For example, the second carrier may be moveable in a vertical axis but may remain fixed relative to the longitudinal axis. The one or more carriers may be moveable by an indexer. For example, the first carrier may be linearly moved by an indexer. The first carrier may be moved (i.e. driven) by the indexer in incremental distances. The incremental distances may be equal to other incremental distances, may differ from other incremental distances, or a combination of both. The first carrier may be able to be moved to and located in a plurality of pre-determined locations. Each pre-determined location may be off-set from another pre-determined location. For example, the indexer may laterally move the first carrier within the first tool portion from a first pre-determined location to one or more subsequent pre-determined locations. The one or more carriers may include a plurality of dimpling forming elements.

The one or more tool portions may include one or more pluralities of dimple forming elements. The dimple forming elements may form dimples (i.e., indentations, depressions, impressions, projections, etc) in sheet metal. The pluralities of dimple forming elements may be located on the first carrier portion, the second carrier portion, or both. The dimple forming elements may include a first plurality of dimple forming elements, a second plurality of dimple forming elements, or both. A first plurality of dimple forming elements may be located on the first carrier. The first plurality of dimple forming elements may be located on opposing sides of the cutting surface, such as on the forward portion of the first carrier and the rearward portion of the first carrier. A second plurality of dimple forming elements may be located on the second carrier. The second plurality of dimple forming elements may be located on opposing sides of a blade or blade receiving area of the second carrier, such as on the forward portion of the second carrier and the rearward portion of the second carrier. The dimple forming elements may include one or more male portions, one or more female portions, or both. The first plurality of dimple forming elements may be aligned and cooperate with the second plurality of dimple forming elements to form a plurality of dimples. For example, one or more male portions (such as in a first carrier) are received within one or more female portions (such as in a second carrier) to form a plurality of dimples or vice-versa. As another example, one or more male portions (such as in a first carrier) may cooperate with one or more male portions (such as in a second carrier) to form a plurality of dimples, such as by being off-set from one another. The dimple forming elements may include one or more wells, one or more dimplers, one or more bores, or any combination thereof. For example, the one or more male portions may include the one or more dimplers, the one or more bores, or both. The one or more male portions of the dimple forming elements may correspond to forming one or more female portions (e.g., indented, concave, or the like) of the plurality of dimples. The one or more female portions may include the one or more wells. The one or more female portions of the dimple forming elements may correspond to forming one or more male portions (e.g., a protrusion, convex, or the like) of the plurality of dimples. The plurality of dimple forming elements may be made of any material which can receive and sustain a force (i.e., die or punch force) without being damaged and without imparting damage (i.e., cracks, holes, scratches, etc.) to the sheet metal. The plurality of dimple forming elements may be made of metal, such as steel.

The dimple forming elements may include a plurality of bores, a plurality of dimplers, or both. The plurality of bores, plurality of dimplers, or both may be located in a carrier, such as the first carrier. The plurality of bores may include a plurality of dimplers disposed within. One or more of the dimplers may include a base. One or more bores may have a diameter about equal to or larger than a diameter of a portion of one or more dimplers. For example, the base of one or more dimplers may have a diameter smaller than or about equal to the diameter of one or more bores. The diameter of the base may allow the one or more dimplers to be disposed within the one or more bores. The base may be generally circular, elliptical, square, triangular, rectangular, polygonal, or any shape suitable for residing within the bore. The base may have a height about equal to or less than a height of the one or more bores, so that the base does not protrude above an upper surface of the first carrier. The plurality of dimplers may include one or more protrusions. The protrusions may extend from the base. The protrusions may extend beyond the upper surface of the first carrier. The one or more protrusions may include one or more generally upright posts. The one or more protrusions may have generally tapered ends. The tapered ends may be substantially flat, pointed, rounded, the like, or any combination thereof. The tapered ends may be sufficiently dull, have a surface area, and/or radius such that upon contact with sheet metal to form the plurality of dimples, the tapered ends do not protrude through the sheet metal resulting in a hole, crack, or other deformity in addition to the plurality of dimples. The one or more protrusions may have a generally cone-like shape. The one or more protrusions may generally taper from the base. The plurality of dimple forming elements may be spaced apart from each other (i.e., other dimple forming elements) by about 10 mm or more, about 50 mm or more, about 75 mm or more, or even about 90 mm or more. The plurality of dimple forming elements may be spaced apart from each other (i.e., other dimple forming elements) by about 300 mm or less, about 250 mm or less, about 200 mm or less, or even about 150 mm or less. A plurality of dimple forming elements may be located along a forward portion of the first tool portion, the first carrier, or both. A plurality of dimple forming elements may be located along a rearward portion of the first tool portion, the first carrier, or both. The distance between adjacent dimple forming elements in the forward portion, rearward portion, or both may be greater than the distance between dimple forming elements located across from each other. For example, the distance between two adjacent dimple forming elements in the forward portion and/or two adjacent dimple forming elements in the rearward portion may be greater than the distance between a dimple forming element in the forward portion located across from a dimple forming portion in the rearward portion. The plurality of dimplers may cooperate with a plurality of wells to form a plurality of dimples.

The plurality of dimple forming elements may include a plurality of wells. The wells may be located in a carrier, such as the second carrier. The plurality of wells may be aligned with the plurality of dimplers. The plurality of wells may be slot shaped, have a longer length than a width of a dimpler, or both. The plurality of wells may be long enough to accommodate lateral movement of the plurality of dimplers, such as lateral movement resulting from movement of the first carrier. The plurality of wells may be shaped so that the wells remain stationary while accommodating lateral movement of the plurality of dimplers. For example, one well may accommodate multiple positions of a dimpler as the dimpler moves laterally. The lateral movement may result from indexing (i.e., incremental movement), such as indexing by a dimpler indexer. The plurality of wells may have a depth to receive the plurality of dimplers with sheet metal therebetween. The plurality of wells may be spaced apart from each other (i.e., other wells) by about 10 mm or more, about 50 mm or more, about 75 mm or more, or even about 90 mm or more. The plurality of wells may be spaced apart from each other (i.e., other wells) by about 300 mm or less, about 250 mm or less, about 200 mm or less, or even about 150 mm or less. A plurality of wells may be located along a forward portion of the second tool portion, the second carrier, or both. A plurality of wells may be located along a rearward portion of the second tool portion, the second carrier, or both. The distance between adjacent wells in the forward portion, rearward portion, or both may be greater than the distance between wells located across from each other. For example, the distance between two adjacent wells in the forward portion and/or two adjacent wells in the rearward portion may be greater than the distance between a well in the forward portion located across from a well in the rearward portion.

The plurality of dimple forming elements may form a plurality of dimples in sheet metal along a cut edge of the sheet metal. One or more of the dimples may include both a female portion and a male portion. The female portion of the dimple may be the concave surface (e.g., inwardly formed) of the dimple. The male portion of the dimple may be the convex surface (e.g. outwardly formed) of the dimple. The plurality of dimples may include about 1, 3, 5, 7, 10, or even more dimples formed along a cut edge of the sheet metal. The plurality of dimples may include about 100, 98, 95, 93, or even less dimples formed along a cut edge of the sheet metal. The plurality of dimples may include even more than about 100 dimples along a cut edge of the sheet metal. The plurality of dimples may be located within about the middle 30%, about the middle 40% or even about the middle 50% of the cut edge. The plurality of dimples may be located within about the outer 10%, about the outer 20%, or even about the outer 30% of the cut edge. The plurality of dimple forming elements may form dimples in sheet metal which are spaced apart. The plurality of dimples may be evenly spaced and/or randomly spaced along the cut edge. The plurality of dimples along a cut edge may be spaced apart from each other (i.e., other dimples) by about 10 mm or more, about 50 mm or more, about 75 mm or more, or even about 90 mm or more. The plurality of dimples along a cut edge may be spaced apart from each other (i.e., other dimples) by about 300 mm or less, about 250 mm or less, about 200 mm or less, or even about 150 mm or less. The plurality of dimple forming elements may form dimples in sheet metal having a width or diameter from about 0.1 mm to about 30 mm. The plurality of dimple forming elements may form dimples in sheet metal having a depth from about 0.1 mm to about 50 mm. The plurality of dimple forming elements may form dimples in a plurality of pre-determined locations. For instance, the plurality of dimple forming elements may be moved linearly. For example, the plurality of dimple forming elements may apply a die or punch force to sheet metal to form a plurality of dimples. To apply the die or punch force, the first plurality of dimple forming elements may be affixed to the first carrier. The first carrier may be located in a first pre-determined location when applying the initial die or punch force. After applying an initial die or punch force, the first carrier may be linearly moved to a subsequent pre-determined location. The subsequent pre-determined location may be linearly off-set from the first pre-determined location. To off-set the pre-determined locations, the first carrier may be moved to the subsequent pre-determined location. By moving the first carrier to a subsequent pre-determined location, a subsequent die or punch force may result in a second plurality of dimples. The second plurality of dimples may be off-set from the first plurality of dimples. To move the first carrier, the plurality of dimple forming elements, or both to and from pre-determined locations, an indexer may be part of the apparatus.

The metal processing apparatus desirably includes an indexer. The indexer may function to translate (e.g., move axially, linearly, incrementally) one or more carriers, one or more pluralities of dimple forming elements, or both. The indexer may include an actuator, dimple support member, or both.

The indexer may include an actuator for driving the one or more carriers, the one or more pluralities of dimple forming elements, or both. The actuator may be hydraulic, pneumatic, electric, thermal, magnetic, mechanical, the like, or any combination thereof. The actuator may be connected to an energy source. For example, the actuator may be connected to a source of compressed air. The actuator may deliver air pressure from the compressed air source. The actuator may include one or more distribution lines. The one or more distribution lines may be air distribution lines. The one or more distribution lines may transfer energy from the energy source to the indexer. For instance, the one or more air distribution lines may transfer compressed air from a compressed air source to the actuator. The air distribution lines may include an incoming airline. The incoming airline may transfer energy from the energy source to a manifold. The air distribution lines may include one or more outgoing air lines connected to the manifold. For example, the actuator may include two outgoing air lines connected to a manifold. The one or more outgoing airlines may provide for a single direction or two directions of linear movement. The outgoing airlines may provide for generally opposing linear directions of movement. For example, a first outgoing airline delivering energy to the first carrier may result in the first carrier traveling in a first direction along the first tool portion. For example, a second outgoing airline delivery energy to the first carrier may result in the first carrier traveling in a second direction, opposite the first direction, along the first tool portion. The actuator may include a manifold. The manifold may control how energy is directed to the one or more air flow lines. By controlling how energy is directed to the one or more air flow lines, the manifold may control the direction of movement of a carrier, such as the first carrier. The manifold may include one or more valves to direct energy (e.g., air flow) to one more air flow lines. The actuator may include an air cylinder. The air cylinder may be a linear air cylinder. The air cylinder may be single-acting or double acting. The air cylinder may be connected to one or more air flow lines, such as the outgoing air flow lines. The air cylinder may be in communication with one or more carriers, one or more pluralities of dimple forming members, and/or one or more dimple support members.

The indexer may include a dimple support member. The dimple support member may be affixed to or in communication one or more tool portions, one or more carriers, one or more pluralities of dimple forming members, the actuator, and/or an air cylinder. The dimple support member may be affixed to both the actuator and a carrier, such as the first carrier. By being connected to the actuator and carrier, the dimple support member may be able to transfer energy from the energy source to the first carrier. By transferring energy (e.g., by releasing compressed air for acting against the air cylinder) from the energy source to the first carrier, the first carrier is able to be moved linearly. The dimple indexer may be able to move the first carrier along one or more axes (e.g., x-axis, y-axis, and/or z-axis) in one or more planes. For example, the dimple indexer may move the first carrier along an axis substantially parallel to the longitudinal axis of the metal processing apparatus, substantially perpendicular to the longitudinal axis of the metal processing apparatus while in the substantially the same plane, and/or substantially perpendicular to the longitudinal axis of the metal processing apparatus while in different plane (i.e., a plane substantially perpendicular). The dimpler indexer, the dimple support member, or both may move the first carrier linearly in one or more directions. For example, the dimpler indexer, dimple support member, or both may move the first carrier in one direction (i.e., transverse) from one pre-determined position to another pre-determined position. For example, the dimpler indexer, dimple support member, or both may move the first carrier in at least two directions, such as transverse, retracting (i.e., moving downward away from second carrier), and extending (i.e., moving upward toward the second carrier). The dimpler indexer, dimple support member, or both may move the first plurality of dimple forming elements while the first carrier remains stationary. For example, the first plurality of dimple forming elements may retract from one or more bores of the first carrier and extend through off-set bores of the first carrier. The dimple support member may linearly move (i.e., incrementally advance) the first carrier. By moving the first carrier, the dimple support member may move the first plurality of dimple forming elements to one or more subsequent pre-determined locations. The pre-determined locations may be off-set from one another. The dimple support member may incrementally advance the first carrier such that the first plurality of dimple forming elements move linearly by about 0.1 mm to about 500 mm, by about 25 mm to about 300 mm, or even from about 50 mm to about 150 mm from one pre-determined location to a subsequent pre-determined location.

A tool portion, such as a first tool portion, may include a cutting surface. The cutting surface may be adapted to be contacted by a blade or other cutting member. The cutting surface may be included in the first carrier. The cutting surface may be below an upper surface of the first carrier (i.e., indented, groove, channel, etc). The cutting surface may have a width, such as a channel or groove width. The width may be larger than a width of a blade, such that the cutting surface may receive the blade. The cutting surface may include a sharpened edge (i.e., a shearing edge). The cutting surface may cooperate with the blade to cut a metal sheet (i.e., a sharpened blade edge may bypass a sharpened edge of the cutting surface to cut the metal). The cutting surface may be located along a cut axis of the first tool portion, the first carrier, or both. The cutting surface may be about parallel to the longitudinal axis of the metal processing apparatus, may be at any angle to the feeding direction, or both. The cutting surface may define the forward portion and the rearward portion in the first tool portion, the first carrier, or both. The side of the first tool portion, the first carrier, or both located on a side of the cutting surface nearest the outgoing end may be defined as the forward portion. The side of the first tool portion, the first carrier, or both located on a side of the cutting surface nearest the incoming end may be defined as the rearward portion.

One or more tool portions, such as the second tool portion, may be configured to receive a blade or may include a blade. The blade may apply a cutting force, cut a front edge, a rear edge, or both of sheet metal. The blade may be located or received between a forward portion and a rearward portion, such as between the forward portion and rearward portion of the second tool portion. The blade may be integral with the forward portion and/or rearward portion of the second tool portion. The blade may be moveable or fixed relative to a tool portion and/or a carrier. For example, the blade may linearly move relative to the second tool portion or second carrier to apply the cutting force, or the blade may remain fixed with the second tool portion or second carrier, such that second tool portion and/or second carrier moves to move the blade to apply the cutting force. The blade may move or be moved toward the cutting surface and/or or the cutting surface may move or be moved toward the blade. The blade may be a sharpened edge of the second carrier, second tool portion or both. The blade may be adjacent to a plurality of dimple forming elements of the second tool portion. A forward portion and/or rearward portion may include one, two, or more sharpened blade edges. The blade may run along part or all of a length of the second tool portion, second carrier, or both. The blade may be parallel with the cutting surface, a longitudinal axis, a plurality of dimple forming elements, or any combination thereof.

The one or more tool portions may include one or more conveying elements. The one or more conveying elements may be adapted for moving a sheet (i.e., a metal sheet) or allowing for movement of a sheet in a feeding direction. The one or more conveying elements may be automated or manual. The one or more conveying elements may be located on the first tool portion, the second tool portion, or both. The one or more conveying elements may be located in one or more side rails. The one or more conveying elements may be incrementally spaced apart along a length of the one or more side rails. The one or more conveying elements include one or more rolling elements, such as one or more individual ball transfer units (i.e., drop-in, flange mount, recessed, stud mount, and/or the like), a ball transfer table, ball transfer rail, one or more gravity rollers, one or more automated rollers, a roller conveyor, the like, or any combination thereof. The one or more rolling elements may be aligned with other rolling elements in one or more axes.

The metal processing apparatus may include one or more control devices. The control devices may coordinate the movement of one or more tool portions, one or more carriers, an indexer, an actuator, one or more pluralities of dimple forming elements, a cutting surface, a blade, one or more conveying elements, and/or sheet metal. The one or more control devices may coordinate the indexer, such as the actuator, with the cutting surface and/or the blade. The indexer may be operated in a coordinated manner with one or more tool portions, one or more carriers, a cutting surface, and/or a blade, such that the indexer is able to incrementally advance and/or linearly move one or more pluralities of dimple forming elements to a pre-determined location (i.e., first pre-determined location, second pre-determined location, etc), such as after the blade and cutting surface form a cut edge in sheet metal. The coordinated manner may include a computer control, camming arrangement, gear arrangement, the like, or any combination thereof. A computer control may be programmed (and include software in a non-transitory storage medium) such that it is configured to cause activation and/or movement of an indexer, one or more carriers, an actuator, a dimple support member, a cutting surface, a blade, a camming arrangement, a gear arrangement, or any combination thereof. The control device may include driving of the actuator. Driving of the actuator may be such that it is in synced with movement of one or more tool portions. For instance, one or more tool portions may move toward another tool portion(s) for cutting of sheet metal to provide a cut edge. Upon movement of the tool portions and/or cutting the cut edge, the actuator may advance a plurality of dimple forming elements. The actuator may advance a plurality of dimple forming elements from one pre-determined location to a subsequent pre-determined location. Advancement of the plurality of dimple forming elements may be by way of a cam driven relationship. In the cam driven relationship, rotations or revolutions of a cam may provide for activation of the actuator. Upon activation, the actuator may then drive the dimple support member, a carrier (i.e., first carrier), or both. By driving the dimple support member and/or carrier, the plurality of dimple forming elements move from one pre-determined location to a subsequent pre-determined location.

The metal processing apparatus may include one or more side edge dimplers. The side edge dimplers may function to create one or more dimples along one or more side edges of a metal sheet. The side edge dimplers may cooperate with the dimple forming elements so that a metal sheet has a plurality of dimples at least at one cut edge and at least at one side edge. The side edge dimplers may have any shape or size to create one or more dimples along one or more side edges of a metal sheet. The side edges may be adjacent to and/or perpendicular to the cut edges of the metal sheet. The side edges may the edges along a pre-determined width of the metal sheet. The side edges may be the edges not cut by a blade of the metal processing apparatus. The side edge dimplers may form a plurality of dimples along one or more side edges of a metal sheet as the metal sheet moves through the metal processing apparatus in the feeding direction. The side edge dimplers may have a plurality of protrusions, indentations, or both. The side edge dimplers may be located in the first tool portion, second tool portion, or both. The side edge dimplers may be in the form of a rotary wheel with indenting protrusions.

The metal processing apparatus may be useful for forming a plurality of dimples in a metal sheet. The metal sheet may be useful in transportation body panels, such as those in automobiles, aircrafts, and/or watercrafts. The metal sheet may initially be provided into the metal processing apparatus as a metal blank or a metal coil. The metal processing apparatus may include or be in communication with a coil feeder. The coil feeder may retain a metal coil while allowing the metal to be uncoiled and fed into a portion of the metal processing apparatus. The metal sheet may be comprised of metal or a metal composite. The metal sheet may be comprised of steel, aluminum, copper, the like, or any combination thereof.

The disclosure relates to a method of using the metal processing apparatus of the teachings herein for dimpling a cut edge portion of a metal sheet. The method includes the following steps: feeding a first metal sheet in a feeding direction; cutting a forward portion of the first metal sheet to define a front cut edge in the first metal sheet; forming a first plurality of dimples located in a first pre-determined location substantially along the front cut edge of the first metal sheet; advancing the first metal sheet in the feeding direction; cutting a rearward portion of the first metal sheet to define a rear cut edge in the first metal sheet and define a perimeter of the first metal sheet; forming a second plurality of dimples in a second pre-determined location substantially along the rear cut edge of the first metal sheet; feeding a second metal sheet in the feeding direction; cutting a forward portion of the second metal sheet to define a front cut edge in the second metal sheet; forming a first plurality of dimples located in a third pre-determined location substantially along the front cut edge of the second metal sheet; advancing the second metal sheet in the feeding direction; cutting a rearward portion of the second metal sheet to define a rear cut edge in the second metal sheet and define a perimeter of the second metal sheet; forming a second plurality of dimples in a fourth pre-determined location substantially along the rear cut edge of the second metal sheet; and forming a stack of metal sheets including the first metal sheet and the second metal sheet. An air gap is located between the first metal sheet and the second metal sheet substantially about the perimeter of the first metal sheet and the second metal sheet. The first pre-determined location is off-set relative to the third pre-determined location and wherein the second pre-determined location is off-set relative to the fourth pre-determined location.

The method includes feeding at least one metal sheet in a feeding direction. The at least one metal sheet may include one or more metal blanks, metal provided by a metal coil, or the like. The at least one metal sheet may include at least one first metal sheet and second metal sheet. The step of feeding at least one metal sheet into the apparatus can be repeated once, twice, ten times, one hundred times, or even indefinitely. The metal may be fed into the apparatus at an incoming end of the apparatus. The incoming end may be at or near the rearward portion of the first tool portion, the second portion, or both. The feeding direction may be generally perpendicular to the longitudinal axis of the apparatus, may extend from the incoming end to the outgoing end, may extend from a rearward portion to a forward portion, or any combination thereof. The feeding direction may be at any angle relative to the cutting surface, blade, or both. The feeding direction may be at any angle from about parallel to about perpendicular relative to the cutting surface, blade, or both. The feeding direction may be at about 90° or less, about 75° or less, or about 60° or less from a longitudinal axis, cutting surface, blade, resulting cut edge, or any combination thereof. The feeding direction may be at about 5° or more, about 10° or more, or about 15° or more from a longitudinal axis, cutting surface, blade, resulting cut edge, or any combination thereof. The feeding direction may run generally perpendicular relative to the cutting surface, blade, or both. One or more conveying elements may enable the metal sheet to be moved in the feeding direction. Feeding the metal sheet may also include advancing the metal sheet in the feeding direction. The metal sheet may be fed into the metal processing apparatus towards the cutting surface, blade, or both.

The method includes cutting a metal sheet to define at least one cut edge of the metal sheet. The method may include cutting a front portion, a rear portion, or both of a metal sheet which may define a front cut edge, a rear cut edge, or both of the metal sheet. The method may include cutting a front portion and/or a rear portion of a first metal sheet to define a front cut edge and/or a rear cut edge of the first metal sheet. The method may include cutting a front portion and/or a rear portion of a second metal sheet to define a front cut edge and/or a rear cut edge in a second metal sheet. By defining the front cut edge and the rear cut edge, a perimeter of the metal sheet may be defined. The cut edge may be linear, arcuate, or both. Cutting may include moving a blade, a cutting surface, one or more tool portions, one or more carriers, or any combination thereof such that the blade and cutting surface apply a cut force on a metal sheet. Cutting a front portion and a rear portion may be completed separately or simultaneously. Cutting a first metal sheet and a second metal sheet may be completed separately or simultaneously. For example, cutting the rear portion of a first metal sheet with a blade may result in simultaneously cutting the front portion of a second metal sheet with the same blade, such that the rear cut edge of the first metal sheet is defined and separated from the front cut edge of the second metal sheet. Before, during, or after cutting the one or more metal sheets, one or more pluralities of dimples may be formed in the one or more metal sheets.

The method includes forming one or more pluralities of dimples in one or more metal sheets. The method may include forming a first plurality of dimples, a second plurality of dimples, or both in a first metal sheet, a second metal sheet, or both. The method may include forming one or more pluralities of dimples substantially along one or more cut edges of one or more metal sheets. The method may include forming a first plurality of dimples substantially along a front cut edge of a first metal sheet, a second metal sheet, or both. The method may include forming a second plurality of dimples substantially along a rear cut edge of a first metal sheet, a second metal sheet, or both. To form the one or more pluralities of dimples, one or more pluralities of dimple forming elements may be located and/or moved to one or more pre-determined locations. For example, a first plurality of dimple forming elements located in a first carrier may be moved from a first pre-determined location to a subsequent pre-determined location. The pluralities of dimple forming elements may be moved to pre-determined locations which are off-set from one another, such that a preceding pre-determined location is off-set from a subsequent off-set location. By moving the pluralities of dimple forming elements, the pluralities of dimples formed in the one or more metal sheets are off-set from one another as opposed to being aligned. To form the one or more pluralities of dimples, one or more pluralities of dimple forming elements may move toward another plurality of dimple forming elements with sheet metal therebetween. To move a plurality of dimple forming elements a second tool portion may move toward a first tool portion, a second carrier may move toward a first carrier, a second plurality of dimple forming elements may move toward a first plurality of dimple forming elements, or any combination thereof. For instance, a second tool portion and/or a second carrier having a plurality of wells may move toward a first tool portion and/or a first carrier. The plurality of wells may receive a plurality of dimplers with the sheet metal therebetween. The second tool portion and/or the second carrier pressing against the first tool portion and/or first carrier may result in a die or punch force. The die or punch force may then result in the sheet metal deforming so that a plurality of dimples are formed along a cut edge of the sheet metal located between the plurality of wells and plurality of dimplers. The one or more pluralities of dimples may include a first plurality of dimples located substantially along a front cut-edge being off-set from a second plurality of dimples located substantially along a rear cut-edge; a first plurality of dimples located substantially along a front cut edge of a first metal sheet being off-set from a first plurality of dimples located along a front cut edge of a second metal sheet; or both. The one or more pluralities of dimples may include a second plurality of dimples located substantially along a rear cut-edge being off-set from a first plurality of dimples located substantially along a front cut-edge; a second plurality of dimples located substantially along a rear cut edge of a first metal sheet being off-set from a second plurality of dimples located along a rear cut edge of a second metal sheet; or both. Forming of the plurality of dimples may be at ambient temperatures. Forming of the plurality of dimples may be in the absence of a heat source.

The method includes forming a stack of metal sheets. The method may include forming a stack with at least a first metal sheet and a second metal sheet. Stacking may be automated or manual. When the metal sheets are placed into the stack, an air gap is located between the metal sheets. The air gap may be about 0.1 mm or more, about 0.5 mm or more, about 1 mm or more. The air gap may be about 50 mm or less, about 45 mm or less, or about 30 mm or less. The air gap may be located substantially about at least a portion of the perimeters of the metal sheets. The air gap may not be present along the entirety of the perimeters of the metal sheets. The air gap may be located substantially along at least the front cut edge, rear cut edge, or both. The air gap may be a result of one or more pluralities of dimples formed in one or more metal sheets. The pluralities of dimples of one sheet may contact (e.g., direct contact) a non-dimpled surface of an opposing stacked sheet, thus creating an air gap between the individual dimples, along at least a portion of the perimeters, or both. The plurality of dimples formed in one sheet (i.e., first metal sheet) may be off-set from a plurality of dimples formed in another sheet (i.e., second metal sheet). By off-setting the dimples, at least some dimples of one sheet are prevented from nesting when stacked with at least some dimples of another sheet. By preventing nesting, the air gap between the metal sheets is maintained.

Illustrative Embodiments

The following descriptions of the Figures are provided to illustrate the teachings herein, but are not intended to limit the scope thereof.

FIGS. 1 and 2 illustrate a metal processing apparatus 10. FIG. 1 shows the metal processing apparatus 10 in an open position 11. FIG. 2 shows the metal processing apparatus in a closed position 13. The metal processing apparatus 10 includes a first tool portion 12 in an opposing relationship to a second tool portion 34. The second tool portion 34 is located above and in opposing relationship to the first tool portion 12. The first tool portion 12 includes a first carrier 14. The second tool portion 34 includes a second carrier 36. In the open position 11, the second tool portion 34 is distanced from the first tool portion 12. In the open position 11, the first carrier 14 is distanced from and opposing the second carrier 36. The open position 11 allows for a metal sheet 76 (not shown) to move through the space between the first carrier 14 and the second carrier 36. In the closed position 13, the second tool portion 34 is moved toward the first tool portion 12. In the closed position, the second carrier 36 is moved toward and cooperates with the first carrier 14. The closed position 13 allows the second carrier 36 to contact the first carrier 14 so that a blade (not shown) of the second carrier 36 cuts an edge (not shown) in a metal sheet 76 (not shown). The closed position 13 allows the first carrier 14 and the second carrier 36 to cooperate together to form a plurality of dimples in a metal sheet 76 (not shown).

FIG. 3 illustrates a first tool portion 12 of a metal processing apparatus 10. The first tool portion 12 includes a first carrier 14. The first tool portion 12 includes a forward portion 16 and a rearward portion 18. The first tool portion 12 includes a cutting surface 20. The cutting surface 20 may be part of the first carrier 14. The cutting surface 20 may be located between the forward portion 16 and the rearward portion 18 of the first tool portion 12. The cutting surface 20 may be adapted to be in contact with a blade (not shown). The cutting surface 20 may be vertically offset (i.e., stepped down, grooved, indented) from an upper surface 21 of the forward portion 16 and/or the rearward portion 18. The first tool portion 12 includes a first plurality of dimple forming elements 22. Some of the first plurality of dimple forming elements 22, 22a may be located on the forward portion 16. The first plurality of dimple forming elements in the forward portion 22a are evenly spaced out along the length of the forward portion 16. Some of the first plurality of dimple forming elements 22, 22b may be located on the rearward portion 18. The first plurality of dimple forming elements in the rearward portion 22b are evenly spaced out along the length of the rearward portion 18. Although FIG. 3 shows the first plurality of dimple forming elements 22 evenly spaced along the lengths of the forward portion 16 and the rearward portion 18, it may be understood the first plurality of dimple forming elements 22 may be spaced unevenly or staggered along the lengths of the first portion 16 and/or the rearward portion 18. The first plurality of dimple forming elements in the rearward portion 22b may be located directly across or opposing the first plurality of dimple forming elements in the forward portion 22a. The first tool portion 12 may include one or more conveying elements 24. The first tool portion 12 may include one or more side rails 26. The one or more side rails 26 may be located on either side of the first carrier 14. The one or more side rails 26 may include a front rail 28, located in the forward portion 16. The one or more side rails 26 may include a rear rail 30, located in the rearward portion 18. The one or more conveying elements 24 may be part of the one or more side rails 26. The one or more conveying elements 24 may include one or more rolling elements 32. The rolling elements 32 may include one or more rollers (i.e., roller ball transfer, ball transfer conveyor strip). The first tool portion 12 may include one or more mating elements 44. The one or more mating elements 44 may be configured to mate with a second tool portion 34 (not shown). The one or more mating elements 44 may be configured to mate with one or more mating elements 46 (not shown) of the second tool portion 34 (not shown). The one or more mating elements 44 may be configured to mate with a second tool portion 34 (not shown) so that the first tool portion 12 is in opposing relation to the second tool portion 34 (not shown).

FIG. 4 illustrates a second tool portion 34 of a metal processing apparatus 10. The second tool portion 34 is adapted to be in opposing relation to the first tool portion 12 (not shown). The second tool portion 34 includes a second carrier 36. The second tool portion 34 includes a forward portion 38 and a rearward portion 40. The second tool portion 34 may be configured to receive a blade 39 or include a blade 39. The blade 39 may be between the forward portion 38 and rearward portion 40. The blade is shown as a blade edge 39 of the forward portion 38. The forward portion 38 may be configured such that both edges are blade edges 39a, 39b. A first blade edge 39 may be adjacent to the rearward portion 40. The forward portion 38 may be able to be reversed (i.e., rotated 180°) when a first blade edge 39a becomes dull, so that a second blade edge 39b may be adjacent to the rearward portion 40. The blade 39 may be adapted to contact the cutting surface 20 (not shown) of the first tool portion 12 (not shown) to form a cut edge (not shown) in a metal sheet (not shown). The second tool portion 34 includes a second plurality of dimple forming elements 42. Some of the second plurality of dimple forming elements 42a may be located on the forward portion 38. The forward portion 38 may include two sets of the second plurality of dimple forming elements 42a. Some of the second plurality of dimple forming elements 43a may be closer to the first blade edge 39a. Some of the second plurality of dimple forming elements 43b may be closer to the second blade edge 39b. By having two sets of the second plurality of dimple forming elements 42a, the blade is able to be rotated 180°. It may be understood that a single set of the second plurality of dimple forming elements 42a in the forward portion 38 may also be used. Some of the second plurality of dimple forming elements 42b may be located on the rearward portion 40. The second plurality of dimple forming elements 42 may be aligned with the first plurality of dimple forming elements 22 (not shown) when the first tool portion 12 is mated with the second tool portion 34. The second plurality of dimple forming elements 42 may be adapted to cooperate with the first plurality of dimple forming elements 22 to form a plurality of dimples 83 (not shown) near a cut edge 82, 88 (not shown) of a metal sheet 76 (not shown). The second tool portion 34 may include one or more mating elements 46. The one or more mating elements 46 may be configured to mate with the first tool portion 12 (not shown). The one or more mating elements 46 may be configured to mate with such as one or more mating elements 44 (not shown) of the first tool portion 12 (not shown). The one or more mating elements 46 may be configured to mate with a first tool portion 12 (not shown) so that the second tool portion 34 is in opposing relation to the first tool portion 12 (not shown). The one or more mating elements 44, 46 of the first tool portion 12 and second tool portion 34 may cooperate together as stop blocks to prevent further motion of the second tool portion 34 toward the first tool portion 12, or vice versa.

FIG. 5 illustrates the first plurality of dimple forming elements 22 in the first carrier 14. The first plurality of dimple forming elements 22 may be a plurality of male dimple forming elements. The first plurality of dimple forming elements may be located in the first carrier 14. The first plurality of dimple forming elements 22 may include two or more first dimple forming elements 22a on the forward portion 16. The first plurality of dimple forming elements 22 may include two or more first dimple forming elements 22*b* on the rearward portion 18. The two or more first dimple forming elements 22*a* on the forward portion 16 may be aligned with one another along a single axis 56. The two or more first forming elements 22*b* on the rearward portion 18 may be aligned with one another along a single axis 58. The first dimple forming elements 22 on the forward portion 16 may be aligned with (i.e., generally opposing, across from) the first dimple forming elements 22 on the rearward portion 18.

FIG. 6 illustrates the second plurality of dimple forming elements 42 in the second carrier 36. The second plurality of dimple forming elements 42 may be a plurality of female dimple forming elements. Two or more second dimple forming elements 42*a* may be located on the forward portion 38 of the second tool portion 34. Two or more second dimple forming elements 42*b* may be located on the rearward portion 40 of the second tool portion 34. The two or more second dimple forming elements 42*a* on the forward portion 38 may be aligned with one another along a single axis 60. The two or more dimple forming elements 42*b* on the rearward portion 40 may be aligned with one another along a single axis 62. The second dimple forming elements 42*a* on the forward portion 38 may be aligned or offset from the second dimple forming elements 42*b* on the rearward portion 40.

FIG. 7 illustrates the first plurality of dimple forming elements 22 in the first carrier 14. The first plurality of dimple forming elements 22 are illustrated as a plurality of male dimple forming elements. The first plurality of dimple forming elements 22 includes a plurality of bores 50. The plurality of bores 50 are configured to receive a plurality of dimplers 48. For example, an individual bore 50 may receive an individual dimpler 48. The plurality of bores 50 are formed as a plurality of bores 50 in the first carrier 14. The plurality of dimplers 48 include one or more protrusions 51. Each protrusion 51 extends from a base 52. The one or more protrusions 51 may be one or more generally upright posts. The one or more protrusions 51 may have a generally cone-like shape which tapers from the base 52. The one or more protrusions 51 have generally tapered ends 54. The base 52 of each individual dimpler 48 is sized such to fit within an individual well 50 (i.e. smaller diameter than a diameter of the well).

FIG. 8 illustrates the second plurality of dimple forming elements 42 in the second carrier 36. The second plurality of dimple forming elements 42 may be a plurality of female dimple forming elements. The second plurality of dimple forming elements 42 may include a plurality of wells 55. The second plurality of dimple forming elements 42 may be generally slot-shaped (i.e., narrow, elongated). Each individual second dimple forming element 42 may have a length longer than the diameter of each individual first dimple forming element 22 (e.g. diameter greater than diameter of protrusion 51 (not shown)). Two or more second dimple forming elements 42*a* may be located on the forward portion 38 of the second tool portion 34. Two or more second dimple forming elements 42*b* may be located on the rearward portion 40 of the second tool portion 34.

Figure 9:
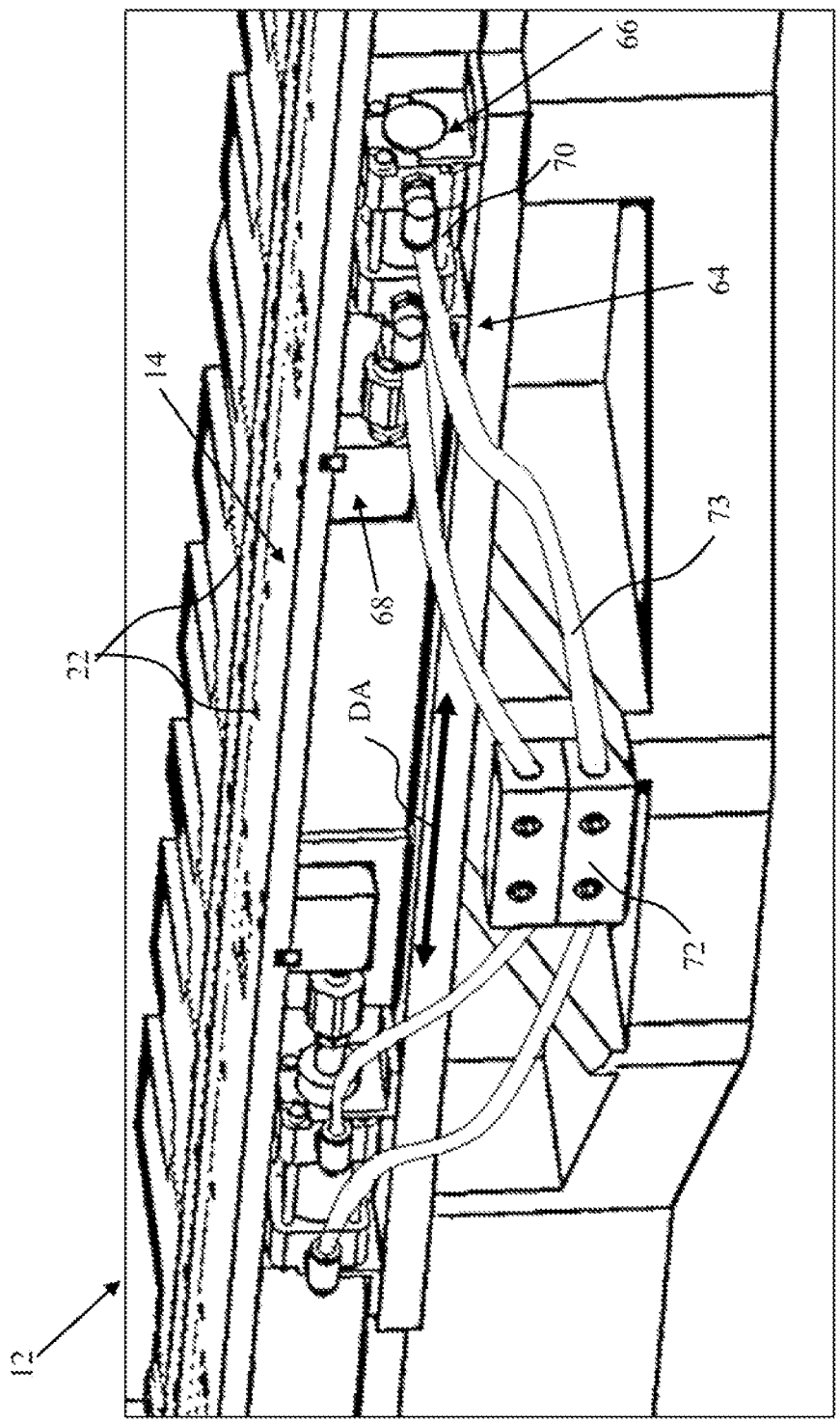
FIG. 9 illustrates the dimpler indexer of a metal processing apparatus according to the teachings.

FIG. 9 illustrates the dimpler indexer 64 which is part of the metal processing apparatus 10. The dimpler indexer 64 may be affixed to the first tool portion 12. The dimpler indexer 64 is in communication with the first plurality of dimple forming elements 22. The dimpler indexer 64 is configured for moving the first plurality of dimple forming elements 22 from at least one first pre-determined location (not shown) to at least one second pre-determined location (not shown). The dimpler indexer 64 may be able to move the first plurality of dimple forming elements 22 along an axis DA. Axis DA may be substantially parallel to the longitudinal axis $L_A$ (as shown in FIG. 3). The dimpler indexer 64 includes an actuator 66 and a dimpler support member 68. The dimpler support member 68 is adjacent to (i.e., below) and/or affixed to the first carrier 14. The dimpler support member 68 carries or is in communication with the first plurality of dimple forming elements 22. The dimpler support member 68 may be able to incrementally advance or move the first plurality of dimple forming elements 22 (i.e., from a first pre-determined position to a second pre-determined position). The actuator 66 includes an air-cylinder 70, a flow-control manifold 72, and one or more air distribution lines 73. The actuator 66 may include or be connected to an air source (not shown) which provides compressed air to the actuator 66.

FIGS. 10 and 11 illustrate movement of the first carrier 14 of the metal processing apparatus 10 from a first position 98 to a second position 100. FIG. 10 shows the first carrier 14 and the first plurality of dimple forming elements 22 in a first position 98. In the first position 98, the first plurality of dimple forming elements 22 are received in and justified toward one end of the slot-shaped second plurality of dimple forming elements 42. The dimpler indexer 64 (not shown) moves the first plurality of dimple forming elements 22 along axis DA to the second position 100. FIG. 11 shows the first plurality of dimple forming elements 22 in the second position 100. In the second position 100, the first plurality of dimple forming elements 22 are received in and justified toward another end of the slot shaped second plurality of dimple forming elements 42. Simultaneously during movement of the first carrier 14 from the first position 98 to the second position 100, the second carrier 36 may be moved away from the first carrier 14 (i.e., upwardly) and then moved toward the first carrier 14.

Figures 12, 13:
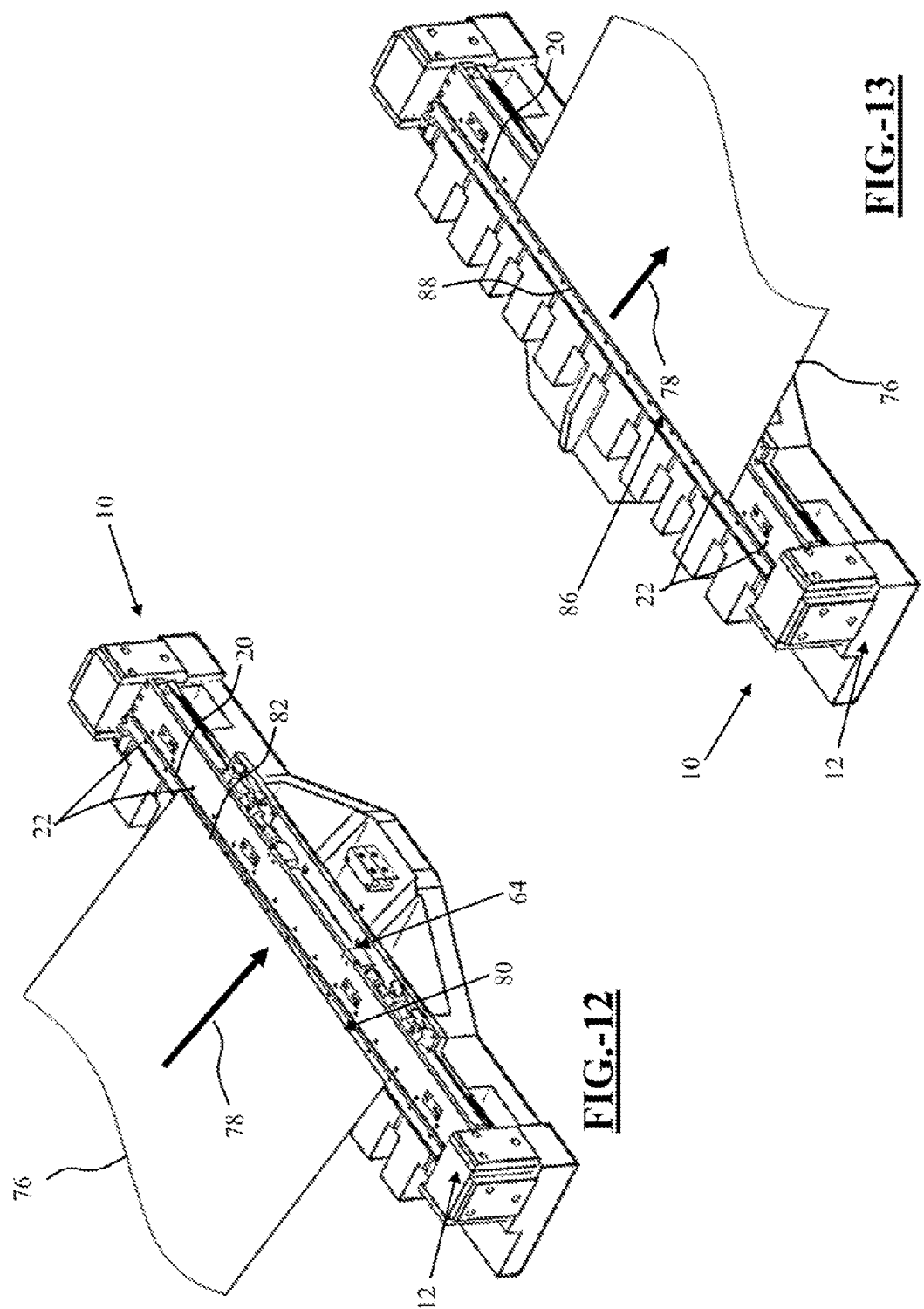
FIG. 12 shows a metal processing apparatus receiving a metal sheet according to the teachings.
FIG. 13 shows a metal processing apparatus finalizing processing of a metal sheet according to the teachings.

FIG. 12 illustrates a metal processing apparatus 10 receiving a metal sheet 76. A metal sheet 76 is fed into the metal processing apparatus 10, in a feeding direction 78. The feeding direction 78 is at an angle, such as perpendicular, to the longitudinal axis $L_A$, the cutting surface 20, cutting blade 39 (not shown), or a combination thereof. A blade 39 (not shown) from the second tool portion 34 (not shown) comes into contact with the cutting surface 20 of the first tool portion 12 to cut a front portion 80 of the metal sheet 76. The front portion 80 where cut is defined as a front cut edge 82 of the metal sheet 76. The first plurality of dimple forming elements 22 may be located at a first pre-determined location (not shown) by the dimpler indexer 64 (not shown). The first pre-determined location may be substantially along the front cut edge 82 of the metal sheet 76. The second plurality of dimple forming elements 42 may then move toward the first plurality of dimple forming elements 22. The first and second plurality of dimple forming elements 22, 42 (not shown) may apply a force onto the metal sheet 76 substantially along the front cut edge 82 such as to form a first plurality of dimples (not shown) substantially along the front cut edge 82. The metal sheet 76 may then be advanced in the feeding direction 78 for a pre-determined distance.

FIG. 13 illustrates a metal processing apparatus 10 finalizing processing on a metal sheet 76. A metal sheet 76, is advanced in the metal processing apparatus 10, in the feeding direction 78. The blade 39 (not shown) from the second tool portion 34 (not shown) comes into contact with the cutting surface 20 of the first tool portion 12 to cut a rear portion 86 of the metal sheet 76. The rear portion 86 where cut is defined as a rear cut edge 88 of the metal sheet 76. The first plurality of dimple forming elements 22 may be located at a second pre-determined location (not shown) by the dimpler indexer 64 (not shown). The second pre-determined location (not shown) may be the same or may be off-set relative to the first pre-determined location (not shown). The second pre-determined location may be substantially along the rear cut edge 88 of the metal sheet 76. The second plurality of dimple forming elements 42 (not shown) may then move toward the first plurality of dimple forming elements 22. The first and second plurality of dimple forming elements 22, 42 (not shown) may apply a force onto the metal sheet 76 substantially along the rear cut edge 88 such as to form a second plurality of dimples (not shown) substantially along the rear cut edge 88. The metal sheet 76 may then be removed from the metal processing apparatus 10.

FIGS. 14a and 14b illustrate a stack of metal sheets 92. Each of the metal sheets 76 includes a plurality of dimples 83. The plurality of dimples may be formed by a metal processing apparatus 10 (not shown) having a plurality of dimple forming elements 22, 42 (not shown). The plurality of dimples 83 may include a first plurality of dimples 84 and a second plurality of dimples 90. A first plurality of dimples 84 may be located along a front cut edge 82 of the metal sheet 76. A second plurality of dimples 90 may be located along a rear cut edge 88 of the metal sheet 76. The stack 92 comprises at least one first metal sheet 75 and at least one second metal sheet 77 stacked upon one another. An air gap 94 is located between the first metal sheet 75 and the second metal sheet 77. The air gap 94 is located substantially at the perimeters 96 of the first and second metal sheets 75, 77. The plurality of dimples 83 in the first metal sheet 75 are offset from the plurality of dimples 83 in the second metal sheet 76 to provide the air gap 94 by preventing the metal sheets 76 from nesting with one another.

REFERENCE NUMERAL LISTING

10 Metal processing apparatus
11 Open position
12 First tool portion
13 Closed position
14 First carrier
16 Forward portion of first tool portion
18 Rearward portion of first tool portion
20 Cutting surface
21 Upper surface of first carrier
22 First plurality of dimple forming elements
22a First plurality of dimple forming elements in forward portion
22b First plurality of dimple forming elements in rearward portion
24 One or more conveying elements
26 One or more side rails
28 Front rail
30 Rear rail
32 One or more rolling elements
34 Second tool portion
36 Second carrier
38 Forward portion of second tool portion
39 Blade edge
39a First blade edge
39b Second blade edge
40 Rearward portion of second tool portion
42 Second plurality of dimple forming elements
42a Second plurality of dimple forming elements in forward portion
42b Second plurality of dimple forming elements in rearward portion
43a Second plurality of dimple forming elements at first blade edge
43b Second plurality of dimple forming elements at second blade edge
44 One or more mating elements of first tool portion
46 One or more mating elements of second tool portion
48 Plurality of dimplers in first tool portion
50 Plurality of bores in first tool portion
51 One or more protrusions of dimpler
52 Base of dimpler
54 Tapered end of dimpler
55 Plurality of wells
56 Forward axis of first plurality of dimple forming elements
58 Rearward axis of first plurality of dimple forming elements
60 Forward axis of second plurality of dimple forming elements
62 Rearward axis of second plurality of dimple forming elements
64 Dimpler indexer
66 Actuator of dimpler indexer
68 Dimpler support member of dimpler indexer
70 Air cylinder of dimpler indexer
72 Flow-control manifold of dimpler indexer
73 Air distribution lines
75 First metal sheet
76 Metal sheet
77 Second metal sheet
78 Feeding direction
80 Front portion of metal sheet
82 Front cut edge of metal sheet
83 Plurality of dimples
84 First plurality of dimples
86 Rear portion of metal sheet
88 Rear cut edge of metal sheet
90 Second plurality of dimples
92 Stack of metal sheets
94 Air gap between metal sheets
96 Perimeter of metal sheet
98 First position
100 Second position
$L_A$ Longitudinal axis
DA Axis Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about"

or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method for dimpling a cut edge portion of a plurality of metal sheets comprising:
   (i) feeding a first metal sheet in a feeding direction;
   (ii) cutting a forward portion of the first metal sheet to define a front cut edge in the first metal sheet;
   (iii) forming a first plurality of dimples located in a first pre-determined location substantially along the front cut edge of the first metal sheet;
   (iv) advancing the first metal sheet in the feeding direction;
   (v) cutting a rearward portion of the first metal sheet to define a rear cut edge in the first metal sheet and define a perimeter of the first metal sheet;
   (vi) forming a second plurality of dimples in a second pre-determined location substantially along the rear cut edge of the first metal sheet;
   (vii) feeding a second metal sheet in the feeding direction;
   (viii) cutting a forward portion of the second metal sheet to define a front cut edge in the second metal sheet;
   (ix) forming a first plurality of dimples located in a third pre-determined location substantially along the front cut edge of the second metal sheet;
   (x) advancing the second metal sheet in the feeding direction;
   (xi) cutting a rearward portion of the second metal sheet to define a rear cut edge in the second metal sheet and define a perimeter of the second metal sheet;
   (xii) forming a second plurality of dimples in a fourth pre-determined location substantially along the rear cut edge of the second metal sheet;
   (xiii) forming a stack of metal sheets including the first metal sheet and the second metal sheet, wherein an air gap is located between the first metal sheet and the second metal sheet substantially about the perimeter of the first metal sheet and the second metal sheet, wherein the air gap is greater than about 0.1 mm; and
   wherein the first pre-determined location is off-set relative to the third pre-determined location and wherein the second pre-determined location is off-set relative to the fourth pre-determined location.

2. The method of claim 1, wherein the steps of cutting the rearward portion of the first metal sheet and cutting the forward portion of the second metal sheet are simultaneous.

3. The method of claim 2, wherein the steps of cutting the rearward portion of the first metal sheet and cutting the forward portion of the second metal sheet are performed by a same blade.

4. The method of claim 1, wherein advancing the first metal sheet in the feeding direction is so that the front cut edge of the first metal sheet is at an angle relative to the feeding direction.

5. The method of claim 4, wherein the step of feeding the first metal sheet includes depositing the first metal sheet onto a conveyor having a plurality of rolling elements.

6. The method of claim 1, wherein the steps of feeding the first metal sheet and the second metal sheet include feeding the first metal sheet and the second metal sheet into an incoming end of a metal processing apparatus.

7. The method of claim 6, wherein the metal processing apparatus includes a blade and a longitudinal axis and wherein the blade is parallel to the longitudinal axis,
   wherein the feeding direction is generally perpendicular to the longitudinal axis and the blade; and
   wherein the blade simultaneously cuts the rearward portion of the first metal sheet and the forward portion of the second metal sheet.

8. The method of claim 6, wherein the metal processing apparatus includes a blade or is configured to receive the blade; and
   wherein the steps of cutting include moving the blade toward a cutting surface and/or moving the cutting surface toward the blade.

9. The method of claim 6, wherein the metal processing apparatus includes a first plurality of dimple forming elements aligned with a second plurality of dimple forming elements;
   wherein the steps of forming the first plurality of dimples and the second plurality of dimples of the first metal sheet include moving the first plurality of dimple forming elements toward the second plurality of dimple forming elements and/or the second plurality of dimple forming elements toward the first plurality of dimple forming elements with the first metal sheet therebetween; and
   wherein the steps of forming the first plurality of dimples and the second plurality of dimples of the second metal sheet include moving the first plurality of dimple forming elements toward the second plurality of dimple forming elements and/or the second plurality of dimple forming elements toward the first plurality of dimple forming elements with the second metal sheet therebetween.

10. The method of claim 9, wherein a plurality of dimplers are part of the first plurality of dimple forming elements and/or the second plurality of dimple forming elements, and a plurality of wells are part of the first plurality of dimple forming elements and/or the second plurality of dimple forming elements; and wherein during the steps of forming the first plurality of dimples and the second plurality of dimples of the first metal sheet and the second metal sheet, the plurality of wells receive the plurality of dimplers.

11. The method of claim 9, wherein after forming the first plurality of dimples of the first metal sheet in the first pre-determined location and/or the second plurality of dimples of the first metal sheet in the second pre-determined location, the first plurality of dimple forming elements and/or the second plurality of dimple forming elements move to an off-set pre-determined location to form the first plurality of dimples of the second metal sheet in the third pre-determined location and/or the second plurality of dimples of the second metal sheet in the fourth pre-determined location.

12. The method of claim 1, wherein the step of forming the stack of metal sheets includes preventing nesting of at least some of the first plurality of dimples and/or the second plurality of dimples of the first metal sheet and the second metal sheet to maintain the air gap.

13. A method for dimpling a cut edge portion of a plurality of metal sheets comprising:
(i) feeding a first metal sheet in a feeding direction into an incoming end of a metal processing apparatus;
(ii) cutting a forward portion of the first metal sheet with a blade of the metal processing apparatus to define a front cut edge in the first metal sheet;
(iii) forming a first plurality of dimples located in a first pre-determined location substantially along the front cut edge of the first metal sheet;
(iv) advancing the first metal sheet in the feeding direction in the metal processing apparatus;
(v) cutting a rearward portion of the first metal sheet with the blade to define a rear cut edge in the first metal sheet and define a perimeter of the first metal sheet;
(vi) forming a second plurality of dimples in a second pre-determined location substantially along the rear cut edge of the first metal sheet;
(vii) feeding a second metal sheet in the feeding direction into the incoming end of the metal processing apparatus;
(viii) cutting a forward portion of the second metal sheet with the blade to define a front cut edge in the second metal sheet;
(ix) forming a first plurality of dimples located in a third pre-determined location substantially along the front cut edge of the second metal sheet;
(x) advancing the second metal sheet in the feeding direction in the metal processing apparatus;
(xi) cutting a rearward portion of the second metal sheet with the blade to define a rear cut edge in the second metal sheet and define a perimeter of the second metal sheet;

(xii) forming a second plurality of dimples in a fourth pre-determined location substantially along the rear cut edge of the second metal sheet;
(xiii) forming a stack of metal sheets including the first metal sheet and the second metal sheet, wherein an air gap is located between the first metal sheet and the second metal sheet substantially about the perimeter of the first metal sheet and the second metal sheet, wherein the air gap is greater than about 0.1 mm; and wherein the first pre-determined location is off-set relative to the third pre-determined location and wherein the second pre-determined location is off-set relative to the fourth pre-determined location.

14. The method of claim 13, wherein the steps of cutting the rearward portion of the first metal sheet and cutting the forward portion of the second metal sheet are simultaneous.

15. The method of claim 13, wherein advancing the first metal sheet in the feeding direction is so that the front cut edge of the first metal sheet is at an angle relative to the feeding direction.

16. The method of claim 13, wherein the metal processing apparatus includes a first plurality of dimple forming elements aligned with a second plurality of dimple forming elements;

wherein the steps of forming the first plurality of dimples and the second plurality of dimples of the first metal sheet include moving the first plurality of dimple forming elements toward the second plurality of dimple forming elements and/or the second plurality of dimple forming elements toward the first plurality of dimple forming elements with the first metal sheet therebetween; and wherein the steps of forming the first plurality of dimples and the second plurality of dimples of the second metal sheet include moving the first plurality of dimple forming elements toward the second plurality of dimple forming elements and/or the second plurality of dimple forming elements toward the first plurality of dimple forming elements with the second metal sheet therebetween.

17. The method of claim 16, wherein a plurality of dimplers are part of the first plurality of dimple forming elements and/or the second plurality of dimple forming elements, and a plurality of wells are part of the first plurality of dimple forming elements and/or the second plurality of dimple forming elements; and wherein during the steps of forming the first plurality of dimples and the second plurality of dimples of the first metal sheet and the second metal sheet, the plurality of wells receive the plurality of dimplers.

18. The method of claim 16, wherein after forming the first plurality of dimples of the first metal sheet in the first pre-determined location and/or the second plurality of dimples of the first metal sheet in the second pre-determined location, the first plurality of dimple forming elements and/or the second plurality of dimple forming elements move to an off-set pre-determined location to form the first plurality of dimples of the second metal sheet in the third pre-determined location and/or the second plurality of dimples of the second metal sheet in the fourth pre-determined location.

* * * * *